United States Patent
Ejzak et al.

(10) Patent No.: US 7,639,669 B2
(45) Date of Patent: Dec. 29, 2009

(54) CONTROLLING COMMUNICATION PATH RESERVATIONS IN A PACKET NETWORK WITH NON-HOMOGENEOUS NODES

(75) Inventors: Richard P. Ejzak, Wheaton, IL (US); Peter J. McCann, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 841 days.

(21) Appl. No.: 11/141,956

(22) Filed: Jun. 1, 2005

(65) Prior Publication Data

US 2006/0274738 A1   Dec. 7, 2006

(51) Int. Cl.
*H04L 12/66* (2006.01)
*H04L 12/28* (2006.01)

(52) U.S. Cl. ............... 370/352; 370/389; 370/395.21; 370/401

(58) Field of Classification Search ............ 370/395.21, 370/395.2, 395.5, 389, 401, 352
See application file for complete search history.

(56) References Cited

U.S. PATENT DOCUMENTS

| | | | | |
|---|---|---|---|---|
| 6,366,577 | B1 * | 4/2002 | Donovan | 370/352 |
| 6,563,794 | B1 * | 5/2003 | Takashima et al. | 370/236 |
| 6,600,735 | B1 * | 7/2003 | Iwama et al. | 370/352 |
| 6,625,156 | B2 * | 9/2003 | Shaio et al. | 370/395.21 |
| 6,778,498 | B2 * | 8/2004 | McDysan | 370/231 |
| 6,898,641 | B1 * | 5/2005 | Kobayashi | 709/238 |
| 7,024,480 | B2 * | 4/2006 | Weik | 709/227 |
| 7,272,134 | B2 * | 9/2007 | Iwama et al. | 370/352 |
| 7,486,684 | B2 * | 2/2009 | Chu et al. | 370/401 |
| 2003/0002512 | A1 * | 1/2003 | Kalmanek et al. | 370/401 |
| 2003/0137971 | A1 * | 7/2003 | Gibson et al. | 370/351 |
| 2004/0022191 | A1 * | 2/2004 | Bernet et al. | 370/230 |
| 2004/0095923 | A1 * | 5/2004 | Ejzak et al. | 370/352 |
| 2006/0182119 | A1 * | 8/2006 | Li et al. | 370/395.52 |
| 2007/0008882 | A1 * | 1/2007 | Oran | 370/229 |

* cited by examiner

*Primary Examiner*—Kwang B Yao
*Assistant Examiner*—Candal Elpenord
(74) *Attorney, Agent, or Firm*—Carmen Patti Law Group, LLC

(57) ABSTRACT

An exemplary method controls features and services implemented by nodes in a first communication network where nodes in a second network are not adapted to provide such control or services. A first signaling message is sent by a device in response to receipt by a recipient in the first network of a packet transmitted from an originator in another network that does not support the control and services of the first network. The first signaling message is received at a first perimeter node of the first network that in response sends second signaling messages to the other perimeter nodes. Upon the determination of the occurrence of an event by a second perimeter node, a third signaling message is sent from the second perimeter node to the recipient so that it traverses intermediate nodes in the first network utilized for carrying packets from the originator to the recipient. The third signaling message contains control information defining a service feature to be controlled by the intermediate nodes.

20 Claims, 2 Drawing Sheets

CONTROLLING COMMUNICATION PATH RESERVATIONS IN A PACKET NETWORK WITH NON-HOMOGENEOUS NODES

BACKGROUND

This invention relates to packet networks and more specifically relates to controlling how packets are processed within a portion of a network of non-homogeneous nodes.

Communication networks, especially Internet protocol (IP) networks, are widely used. Packets transmitted over these networks may carry a variety of information. Some information can be categorized as data, wherein packets carrying data do not normally require special handling measures, e.g. quality of service. However, packets carrying other types of information, e.g. voice over Internet protocol (VOIP), will benefit from a higher quality of service such as ensuring adequate bandwidth exists and that arrival time delays are maintained within predetermined limits.

In existing practice, a reservation signaling protocol can be utilized to establish a higher quality of service in a packet network between a communication originator and a communication recipient. This requires that the communication originator initiate a signaling message addressed to the communication recipient. The packet nodes along the communication path receive and interpret this message, and the communication recipient must receive this message before it transmits a reservation request signaling message. The packet nodes along the communication path then set up a specified quality of service communication path from the communication originator to the communication recipient. It will be apparent that at least the communication originator, communication recipient, and one or more nodes in the interior of the network must be able to recognize the signaling message in order to implement this reservation signaling protocol. That is, the network must be substantially homogeneous with regard to capability of the nodes of the network to recognize control instructions and implement the requested functions.

It is desirable that new communication protocols be able to be incrementally deployed within a subset of nodes of a packet network. That is, even within a network owned by the same entity it may not be desirable or even feasible to upgrade all nodes with a new communication protocol at the same time. Even if one entire network is upgraded, communications often traverse multiple networks owned by different entities. Therefore, it is unlikely that all of the different owners of the various networks would implement a new communication protocol at all of the nodes in each of the networks at the same time. Thus, it cannot be assumed that a communication path will only traverse nodes that are substantially homogeneous with regard to communication protocols. In particular, it is desirable for a communication recipient to be able to deploy a new communication protocol without requiring the communication originator to deploy the same communication protocol and vice-versa.

As will be discussed in the Detailed Description section, one aspect of the present invention resides in a recognition of the difficulties presented by the incremental deployment of a new communication protocol in a packet network. Such a deployment is further complicated in view of the asymmetric routes normally assigned for two-way communications between a communication originator and the communication recipient. Thus, there exists a need to support quality of service functions in a non-homogeneous packet network for at least such nodes that are capable of such support.

SUMMARY

It is an object of the present invention to satisfy this need.

An exemplary method controls features and services implemented by nodes in a first communication network where nodes in a second network are not adapted to provide such control or services. A first signaling message is sent by a device in response to receipt by a recipient in the first network of a packet transmitted from an originator in another network that does not support the control and services of the first network. The first signaling message is received at a first perimeter node of the first network that in response sends second signaling messages to the other perimeter nodes. Upon the determination of the occurrence of an event by a second perimeter node, a third signaling message is sent from the second perimeter node to the recipient so that it traverses intermediate nodes in the first network utilized for carrying packets from the originator to the recipient. The third signaling message contains control information defining a service feature to be controlled by the intermediate nodes.

Other exemplary methods reside in the implementation of the control provided in accordance with the present invention by the perimeters nodes.

DESCRIPTION OF THE DRAWINGS

Features of exemplary implementations of the invention will become apparent from the description, the claims, and the accompanying drawings in which:

DETAILED DESCRIPTION

Figure 1:
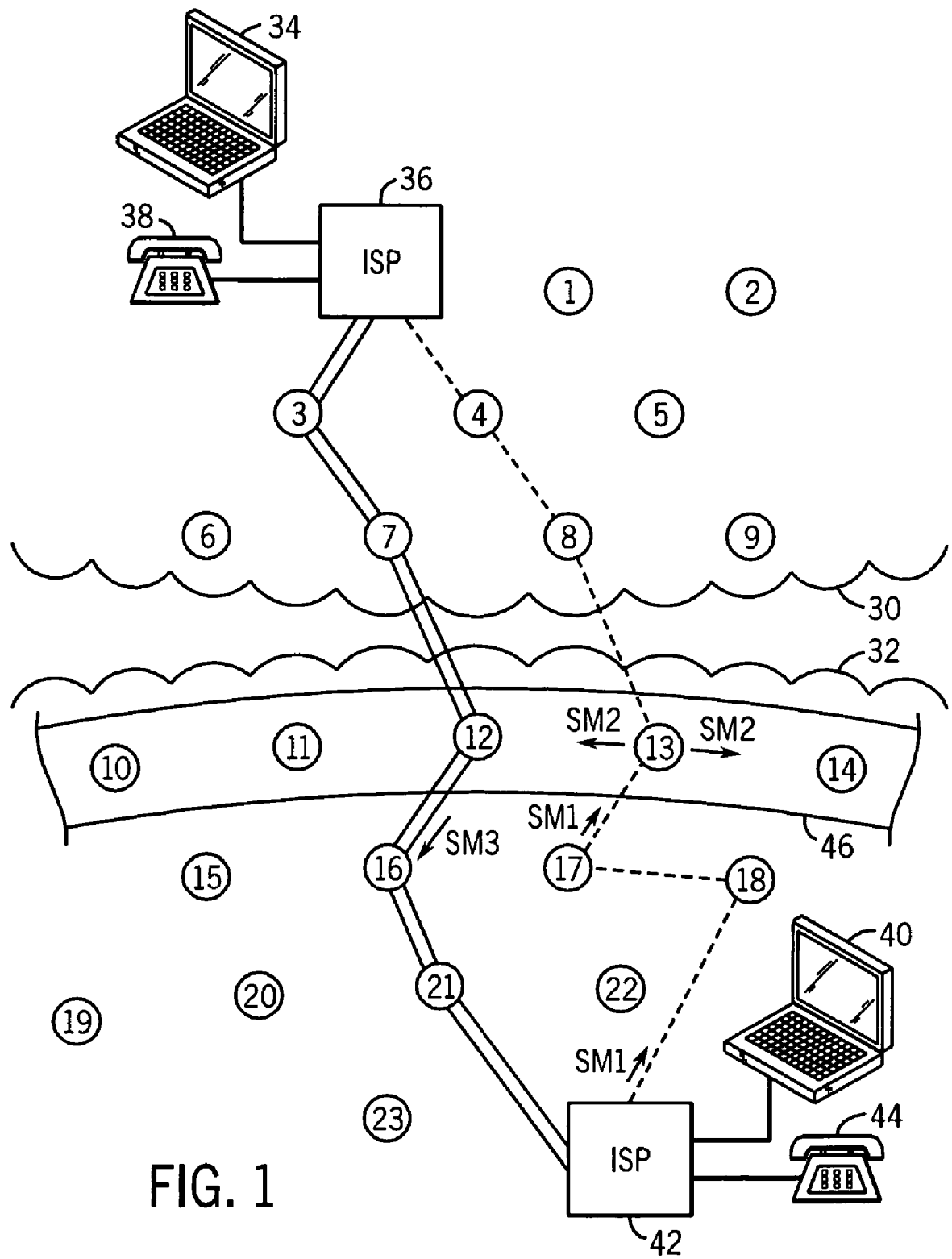
FIG. 1 is a block diagram of a packet network suited for implementing an embodiment of the present invention.

One aspect of the present invention resides in the recognition of the difficulties presented by the incremental deployment of a new communication protocol in part of a packet network. Conventional Internet protocol routing tables are asymmetric, i.e. the nodes of a return communication path from the receiver (recipient) of a communication received from a sender (originator) are selected independently of the nodes selected to form the communication path from the sender to the receiver. Therefore the probability is very high that the return communication path will utilize different nodes than are used for the origination communication path.

A further recognition in accordance with the present invention is that it is desired to utilize new capabilities of a new communication protocol where the portion of the packet network with the new communication protocol exists at nodes in an area serving the communication recipient (a first serving area) but not the communication originator (a second serving area). For example, if the nodes in a second area serving the communication originator utilized the new communication protocol, then nodes in the second area would be responsive to control information generated as part of the communication origination and could implement the requested functionality. Even if nodes in a first area serving the communication recipient did not utilize the new communication protocol, the control information in the packets to the communication recipient would simply be ignored by the nodes in the first area. This would at least permit the new capabilities to be utilized within the second area.

Now assume a reverse scenario, i.e. the nodes in a second area serving the communication originator do not utilize the new communication protocol and the nodes in the first area serving the communication recipient have the new communication protocol. Since the nodes in the second area serving the call originator do not utilize the new communication protocol, there will be no control information related to the new communication protocol generated and transmitted as part of the packets from the communication originator. Thus, even when these packets enter the first area in which the nodes have the new communication protocol, there will be no control information that will allow these nodes to implement functionality associated with the new communication protocol.

This problem is not solved by merely having the communication recipient transmit a reply to the communication originator where the reply contains control information to alert the nodes in the second area to utilize the new communication protocol. This technique does not solve the problem because the path that will be established from the communication recipient to the communication originator will not likely be the same nodes utilized to carry the communication from the communication originator to the communication recipient. Hence, any control information contained in packets transmitted from the communication recipient to the communication originator will not likely reach the nodes in the second network that carry the reverse communications.

A brief overview of an embodiment of the present invention will be helpful in understanding the detailed explanation that follows. In the illustrated embodiment, the nodes in a second area serving the communication originator do not employ a new communication protocol and the nodes in a first area serving the communication recipient do utilize a new communication protocol that is desired to be implemented for the communications between the originator and recipient. Upon receiving the incoming communication, a device (preferably associated with an end link) near the recipient generates and transmits a first signal message having the originator as the destination. An independent communication path for communications from the recipient to the originator is selected. The first area includes a plurality of perimeter nodes through which communications between the first and second areas must pass. The perimeter node in this independent communication path recognizes the first signal message and transmits a second signal message to the other perimeter nodes. The second signal messages include information concerning the new communication protocol functionality desired as well as the addresses of the originator and recipient. The perimeter nodes store this information and monitor for packets addressed to the recipient from the originator. Upon detecting such packets, the perimeter node in the communication path from the originator to the recipient generates a third signaling message that is passed to the nodes in the first area ahead of or as part of the packet being transmitted to the recipient. The nodes in the first area all monitor for the receipt of packets containing the third signaling message and hence the packets in the communication path to the recipient within the first area are alerted to utilize the desired functions associated with the new communication protocol. Therefore, in accordance with an embodiment of the present invention, functionality associated with the new communication protocol can be utilized even in a non-homogeneous packet network.

FIG. 1 illustrates a non-homogeneous packet network suited for incorporation of an embodiment of the present invention. A plurality of nodes 1-9 are part of a first network 30 and nodes 10-23 are part of a second network 32. In the illustrated embodiment the nodes in the second network 32 employ a new communication protocol including functionality and features such as extended quality of service options. The nodes in the first network 30 do not employ the new communication protocol. As utilized herein reference is made to the "new communication protocol" although it will be understood that this merely refers to a different communication protocol as compared with the communication protocol utilized elsewhere.

A communication device 34 which may comprise a laptop computer with built-in VOIP capabilities is supported by an Internet service provider (ISP) 36 which supports communications over the Internet through at least nodes 3 and 4. A VOIP telephone 38 is also supported by ISP 36. It will be understood that devices 34 and 38 are merely exemplary of a wide variety of communication devices that can be utilized for a variety of communications.

A communication device 40 which may comprise a laptop computer with built-in VOIP capabilities is supported by ISP 42 which supports communications over the Internet through at least nodes 18 and 21. A VOIP telephone 44 is also supported by ISP 42. It will be understood that devices 40 and 44 are merely exemplary of a wide variety of communication devices that can be utilized for a variety of communications.

Network 32 includes illustrated nodes 10-14 that comprise part of a set of perimeter nodes 46. These perimeter nodes are preferably selected to include nodes through which all communications to and from other nodes in the network 32 must pass. Although these nodes are labeled as "perimeter", the nodes need not necessarily comprise the entire parameter of the network in a geometric sense. These perimeter nodes basically function as communication gateways. It is also envisioned that circumstances may exist in which only some, but not all, of the possible gateway nodes may be defined to comprise part of the perimeter nodes 46. For example, it may only be desired to implement an embodiment of the present invention with regard to communications coming from (or going to) a specific other network, and hence only the gateway nodes that are gateways to the other specific network need comprise the perimeter nodes 46. As will be explained in more detail below, the perimeter nodes 46 have capabilities and functions that the other nodes in network 32 need not have.

Figure 2:
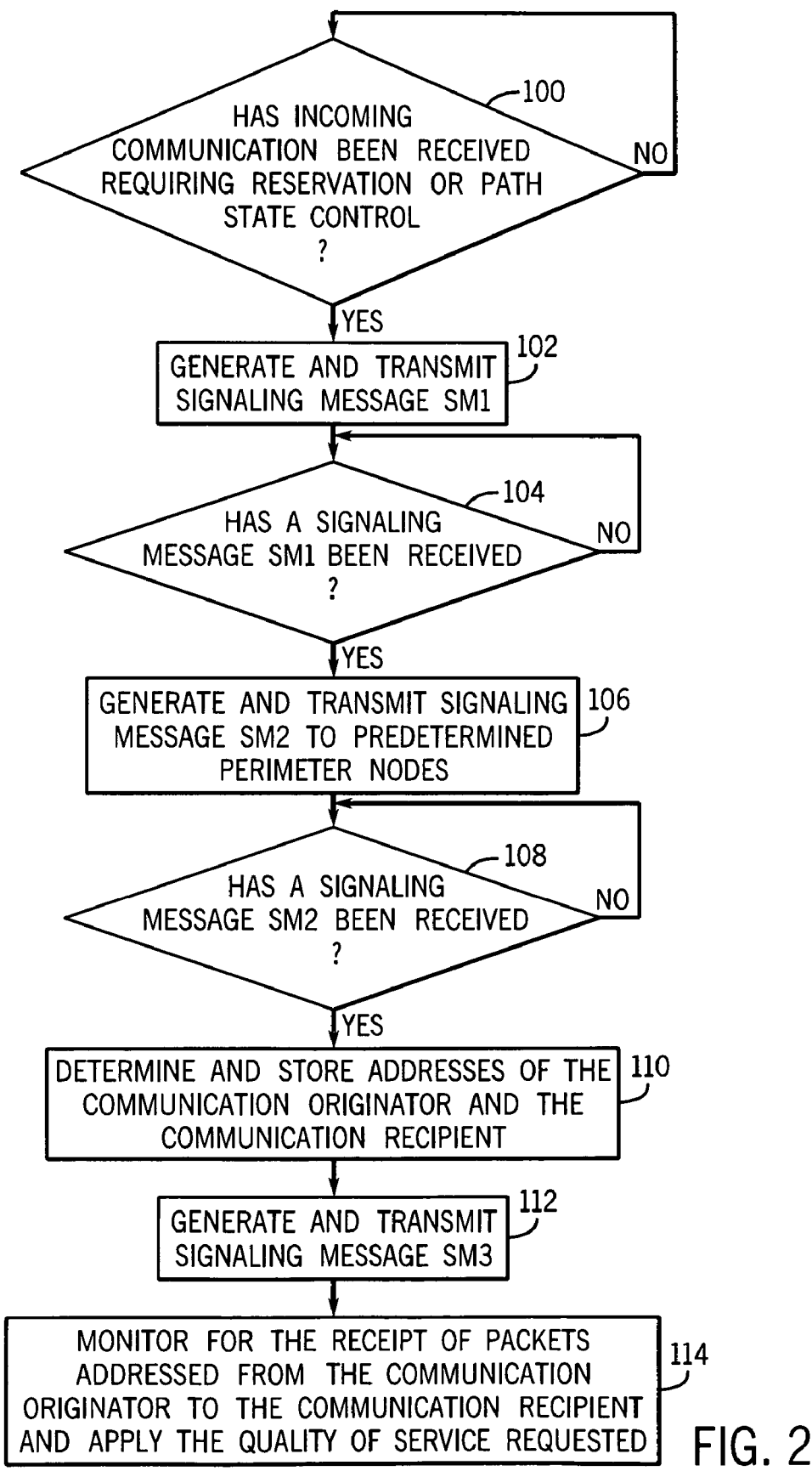
FIG. 2 is a flow diagram of exemplary steps in accordance with the present invention.

FIG. 2 is a flow diagram of an exemplary method in accordance with the present invention. Although exemplary steps of an embodiment of the present invention are shown in FIG. 2, reference should also be made to FIG. 1 in order to better appreciate its overall operation and implementation. In the illustrative example, a user of VOIP telephone 38 (communication originator) initiates a VOIP telephone call to a user of VOIP telephone number 44 (communication recipient). The nodes of network 30, which provides communication services to the ISP 36 serving VOIP telephone 38, do not utilize the new communication protocol that is utilized with the nodes of network 32 that supports ISP 42 serving VOIP telephone 44. The communication recipient desires to take advantage of the improved quality of service features that are supported by the new communication protocol of the nodes of network 32. In this example, it is desired to reserve a specified bandwidth adequate to support a predetermined quality of voice communications on the nodes with corresponding capabilities serving communications between the communication originator and the communication recipient.

In step 100 a determination is made if an incoming communication has been received that requires reservation or path state control. This determination may be made at a convenient node in the vicinity of the communication recipient, by the ISP 42 that serves the communication recipient 44, or by an intelligent VOIP telephone itself. In this example the communication path has been established from the originator to the recipient by nodes 3, 7, 12, 16, and 21 as indicated by the double lines in FIG. 1.

A NO determination results in the process returning to the input of this step thereby effectively creating a wait state. A YES determination by step 100 results in the generation and transmission of a signaling message SM 1 from the communication recipient to the communication originator at step 102. This signaling message can be generated by the same device that made the determination associated with step 100. The recipient to originator communication path includes nodes 18, 17, 13, 8 and 4 as indicated by the dashed line in FIG. 1. This signaling message as well as all other signaling messages should preferably utilize a convention by which the messages cease to be valid. For example, the signaling messages could include an origination time parameter upon which a timeout of validity could be based or specific update messages could be generated to invalidate a previously sent signaling message.

The signaling message SM 1 constitutes a new command such as embedded in a header of a packet addressed to the communication originator from the communication recipient. Normal IP routing table techniques are utilized to establish a node-to-node communication path from the recipient to the originator for signaling message SM 1. The signaling message SM 1 preferably includes the address of the originator, the address of the recipient, a flag or indicator identifying the packet as a signaling message SM 1, and information specifying the functionality to be provided by the new communication protocol, e.g. a reservation of predetermined minimum bandwidth. If desired in order to differentiate among other possible unrelated communications that could also be occurring between the originator and recipient, a specific port or protocol identification of the originator, recipient or both could also be transmitted with SM 1.

In step 104 a determination is made of whether a signaling message SM 1 has been received. In this example, this determination is made at node 13, i.e. a node in the set of perimeter nodes 46. Each of the perimeter nodes monitors at least packets received from within network 32 to determine if the packet is a signaling message SM 1. Although the nodes in the set of perimeter nodes in network 32 monitor for the reception of a signaling message SM 1, the other nodes within network 32 need not have, but could permissibly have, such monitoring functionality. The nodes that serve as perimeter nodes could be provisioned as such. Alternatively, the perimeter nodes could each broadcast its identity as a perimeter node to the other nodes in the same network or each perimeter node could poll the other nodes in the same network seeking to identify the other perimeter nodes. Any firewall information utilized as part of an embodiment of the present invention (see paragraph 29 below) could be communicated in the same manner. A NO determination by step 104 returns to the input of the step creating an effective wait state. A YES determination by step 104 results in the perimeter node 13 generating and transmitting signaling messages SM 2 to the other perimeter nodes. A signaling message SM 2 contains substantially the same information contained in signaling message SM 1 but the signaling message SM 2 has a different flag or indicator that differentiates it from a signaling message SM 1. This permits a perimeter node receiving a signaling message SM 2 to understand that this message is a command issued from another perimeter node as opposed to a message generated by the recipient, i.e. a signaling message SM 1.

In step 108 a determination is made if a signaling message SM 2 has been received at a perimeter node. A NO determination results in processing returning to the input of this step creating a wait state that effectively monitors for the receipt of a signaling message SM 2. This step is practiced by each of the perimeter nodes. A YES determination by step 108 results in the perimeter node receiving the signaling message SM 2, and determining and storing information contained in the signaling message SM 2 at step 110. This information includes at least the addresses of the originator and recipient, and desired quality of service functionality. In this example, node 12 receives the signaling message SM 2 from node 13 and stores the contained information.

In this illustrative example, node 12 checks its routing tables to determine if a traffic path from the originator to the recipient has been set up through it. Upon determining that such a traffic path has been set up through this node, node 12 proceeds to generate and transmit a signaling message SM 3 over the same traffic path to the recipient in step 112. The signaling message SM 3 also preferably contains the same information contained in signaling messages SM 1 and SM 2, but signaling message SM 3 contains a flag or indicator that differentiates this message so that nodes (node 16 and 21) will recognize it as a type SM 3 message. In step 114 the nodes within network 32 that are not perimeter nodes continually monitor for the receipt of packets of the SM 3 message type. Upon determining that such a message type has been received, the nodes that form the traffic path associated with communications from the originator to the recipient, apply the requested quality of service. In this example, each of nodes 12, 16 and 21 apply the requested quality of service, and reserve a predetermined minimum bandwidth suited for quality voice communications over the traffic path established for communications from the originator to the recipient.

Alternatively with respect to step 112, a perimeter node having received a signaling message SM 2 can wait and monitor packets being transmitted through the perimeter node to identify a packet being transmitted from the originator to the recipient. Upon node 12 determining that a packet from the originator addressed to the recipient as identified in the signaling message SM 2 has been received for routing, node 12 then proceeds to carry out step 112 by transmitting the signaling message SM 3 prior to transmitting the normal packet also having a destination of the recipient. This permits node 16 and 21 to receive the signaling message SM 3 ahead of the packet message carrying user information so that the quality of service requested can be implemented. Alternatively, the signaling message SM 3 may be sent following the normal packet having a destination of the recipient to allow for parallel processing paths inside node 12, for example, a slow path for signaling messages such as SM 3 and a fast path for normal data packets. In this case the quality of service functionality may be established somewhat after one or more normal packets are transmitted which may be acceptable in some deployments. The quality of service functionality can be maintained as long as the communication path remains active, or can be altered by the generation of a new quality of service command by the recipient.

It may also be advantageous to utilize ingress filtering tables (firewalls) in gateway nodes, e.g. perimeters nodes. Such tables could be used to limit the number of nodes that must be notified with an SM 2 message since the nodes that are programmed to drop packets of unauthorized origination/destination need not be sent SM 2 messages that contain information describing normal data packets that would be dropped based on the firewall. Limiting the transmission of messages SM 2 would require, for example, the ingress filtering table of node 12 to be made available at node 13. This availability may be accomplished through, for example, manual provisioning or some other signaling protocol. Even if the ingress filtering table of node 12 is not made available at node 13, causing node 13 to send message SM 2 unnecessarily, the message SM 2 can be examined and discarded by node 12 based on its own ingress filtering table with no further processing required, thus helping to limit the overall complexity of the protocol.

Although exemplary implementations of the invention have been depicted and described in detail herein, it will be apparent to those skilled in the art that various modifications, additions, substitutions, and the like can be made without departing from the spirit of the invention. For example, instead of a network 32 being completely enclosed by perimeter nodes, the perimeter or gateway nodes may merely consist of an interface to a particular other network having nodes that do not utilize the new communication protocol. It will be apparent to those skilled in the art that the specific features and services that can be implemented utilizing an embodiment of the present invention is limited only by the capabilities of the new communication protocol, and is not limited to only reserving a predetermined bandwidth. In the situation in which only a single gateway node in the network employing the new communication protocol is relevant to the implementation of an embodiment of the present invention, it will be apparant that the signaling message SM 2 is not required in view of the single gateway (perimeter) node which will by default also handle the transmission of packets from the originator to the recipient.

The scope of the invention is defined in the following claims.

We claim:

1. A method for controlling features implemented by nodes in a first communication network comprising the steps of:
   generating and transmitting a first signaling message by a device in the first network in response to receipt by a recipient in the first network of a packet transmitted from an originator in another network, the first signaling message comprising an address of the recipient and originator, and control information defining the feature to be controlled;
   receiving at a first perimeter node of the first network the first signaling message;
   generating and transmitting second signaling messages from the first perimeter node to the other perimeter nodes of the first network in response to receipt of the first signaling message, the second signaling messages each comprising the address of the recipient and originator, and the control information defining the feature to be controlled;
   receiving at a second perimeter node of the first network the second signaling message and storing information contained in the second signaling message;
   upon the determination of the occurrence of an event by the second perimeter node, generating and transmitting a third signaling message from the second perimeter node to the recipient so that the third signaling message traverses intermediate nodes in the first network utilized for carrying packets from the originator to the recipient, the third signaling message comprising the address of the recipient and originator, and the control information defining the feature to be controlled;
   the intermediate nodes adapted to read the control information contained within the third signaling message and implement communication services in accordance with the control information.

2. The method of claim 1 wherein the step of generating and transmitting the first signaling message is implemented by a device associated with an end link in which packets transmitted from the originator to the recipient are delivered to the recipient.

3. The method of claim 1 further comprising the steps of configuring a set of nodes of the first network to function as perimeter nodes wherein only the perimeter nodes in the first network are adapted to monitor for the receipt of the control information contained within a first signaling message.

4. The method of claim 3 further comprising the step of configuring the perimeter nodes of the first network such that only the perimeter nodes of the first network are adapted to generate and transmit the second signaling messages.

5. The method of claim 3 wherein the step of configuring the set of nodes further comprises configuring all nodes in the first network that function as a gateway with the other network to be perimeter nodes.

6. The method of claim 1 wherein the event determined by the second perimeter node comprises determining that a communication path has been established from the originator to the recipient that includes the second perimeter node.

7. The method of claim 6 wherein the step of determining that a communication path has been established from the originator to the recipient comprises determining if a routing table associated with the second perimeter node contains a communication path from the originator to the recipient.

8. The method of claim 6 wherein the step of determining that a communication path has been established from the originator to the recipient comprises storing the information contained in the second signaling message at the second perimeter node, monitoring packets being routed through the second perimeter node to determine when a certain packet has been received from the originator having the recipient as a destination, and upon the latter having been determined generating and transmitting the third signaling message prior to the transmission of the certain packet.

9. The method of claim 1 wherein the nodes of the another network lack the capability of being able to discern the control information contained in the first signaling message.

10. The method of claim 1 further comprising the step of ascertaining which nodes in the first network function as perimeter nodes.

11. A method implemented by perimeter nodes in a first communication network comprising the steps of:
   receiving at a first perimeter node of the first network a first signaling message transmitted by a device in the first network in response to receipt by a recipient in the first network of a packet transmitted from an originator in another network, the first signaling message comprising an address of the recipient and originator, and control information defining the feature to be controlled;
   generating and transmitting second signaling messages from the first perimeter node to the other perimeter nodes of the first network in response to receipt of the first signaling message, the second signaling messages each comprising the address of the recipient and originator, and the control information defining the feature to be controlled;
   receiving at a second perimeter node of the first network the second signaling message and storing information contained in the second signaling message;

upon the determination of the occurrence of an event by the second perimeter node, generating and transmitting a third signaling message from the second perimeter node to the recipient so that the third signaling message traverses intermediate nodes in the first network utilized for carrying packets from the originator to the recipient, the third signaling message comprising the address of the recipient and originator, and the control information defining the feature to be controlled;

the intermediate nodes adapted to read the control information contained within the third signaling message and implement communication services in accordance with the control information.

12. The method of claim 11 wherein the step of generating and transmitting the first signaling message is implemented by a device associated with an end link in which packets transmitted from the originator to the recipient are delivered to the recipient.

13. The method of claim 11 further comprising the steps of configuring a set of nodes of the first network to function as perimeter nodes wherein only the perimeter nodes in the first network are adapted to monitor for the receipt of the control information contained within a first signaling message.

14. The method of claim 13 further comprising the step of configuring the perimeter nodes of the first network such that only the perimeter nodes of the first network are adapted to generate and transmit the second signaling messages.

15. The method of claim 13 wherein the step of configuring the set of nodes further comprises configuring all nodes in the first network that function as a gateway with the other network to be perimeter nodes.

16. The method of claim 11 wherein the event determined by the second perimeter node comprises determining that a communication path has been established from the originator to the recipient that includes the second perimeter node.

17. The method of claim 16 wherein the step of determining that a communication path has been established from the originator to the recipient comprises determining if a routing table associated with the second perimeter node contains a communication path from the originator to the recipient.

18. The method of claim 16 wherein the step of determining that a communication path has been established from the originator to the recipient comprises storing the information contained in the second signaling message at the second perimeter node, monitoring packets being routed through the second perimeter node to determine when a certain packet has been received from the originator having the recipient as a destination, and upon the latter having been determined generating and transmitting the third signaling message prior to the transmission of the certain packet.

19. The method of claim 11 wherein the nodes of the another network lack the capability of being able to discern the control information contained in the first signaling message.

20. The method of claim 11 further comprising the step of ascertaining which nodes in the first network function as perimeter nodes.

* * * * *

UNITED STATES PATENT AND TRADEMARK OFFICE
CERTIFICATE OF CORRECTION

| | | |
|---|---|---|
| PATENT NO. | : 7,639,669 B2 | Page 1 of 1 |
| APPLICATION NO. | : 11/141956 | |
| DATED | : December 29, 2009 | |
| INVENTOR(S) | : Ejzak et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1246 days.

Signed and Sealed this

Twenty-first Day of December, 2010

David J. Kappos
*Director of the United States Patent and Trademark Office*